May 5, 1970     A. J. CARSELLO     3,510,103

VALVE AND SEAL THEREFOR

Filed Feb. 28, 1968

INVENTOR.
ANTHONY J. CARSELLO
BY Lyon & Lyon
ATTORNEYS

United States Patent Office 3,510,103
Patented May 5, 1970

3,510,103
VALVE AND SEAL THEREFOR
Anthony J. Carsello, 1728 S. La Cienega,
Los Angeles, Calif. 90035
Filed Feb. 28, 1968, Ser. No. 708,961
Int. Cl. F16k 25/00
U.S. Cl. 251—333                                6 Claims

ABSTRACT OF THE DISCLOSURE

A valve and seal therefor in which the seal of elastomeric material is in the form of a disk having a conical seal element bordered upstream and downstream by buttress elements of triangular cross section; the valve being arranged to clamp the disk and having diverging walls which back the buttress elements as well as a valve face which engages the seal element.

SUMMARY OF THE INVENTION

Valve seals of elastomeric material used under conditions of high pressure and temperature, or under either high or low pressure at cryogenic temperature, are subject to forces which cause rapid deterioration. This invention seeks to provide an improved elastomeric valve seal and a valve to accommodate the seal intended to meet severe conditions of use, thus the objects of this invention include:

First, to provide a valve and a seal therefor in which the seal includes a seal disk capable of being clamped and axially compressed to form a fixed seal, and an annular seal element adapted to be engaged by a relatively movable opposing valve face forming a part of the valve, the seal also having axially upstream and downstream buttressing elements which resist and distribute the radial forces developed in the seal when the first annular portion is tightly clamped by components of the valve.

Second, to provide a seal for valves, as indicated in the preceding object, in which the buttressing elements and the seal face therebetween define an essentially conical surface; however, the seal face being forward of the buttress faces and thus first to engage the opposing seal face of the valve so that the seal is initiated by line contact and spreads toward the surfaces of the buttressing elements as the contact pressure is increased.

Third, to provide a valve and seal therefor, as indicated in the preceding objects, wherein the material comprising the seal displaces toward the buttressing elements as the contact pressure is increased, and the buttressing elements are so supported by the backing walls of the valve that the stress in the seal is distributed as to maintain the peak stress at a minimum and avoid stress concentration.

Fourth, to provide a valve and seal therefor which may include a fixed annular seal having a tapered bore engaging a valve plunger movable therein, or the seal may be installed on the valve plunger and engage surrounding fixed valve face.

Fifth, to provide a seal of this type which may be adapted for use with a ball valve.

Figure 1:
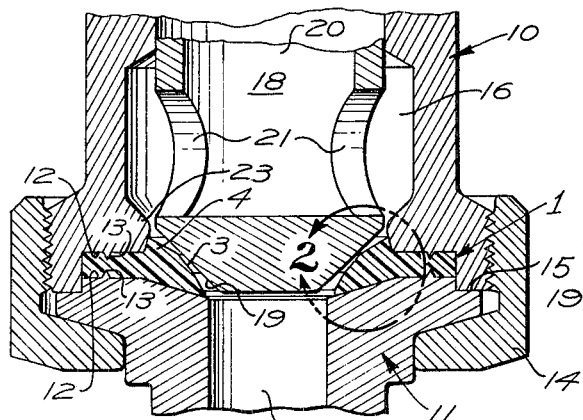
FIG. 1 is a fragmentary sectional view of the valve and seal therefor, showing the valve as it approaches sealing contact.
Figure 2:
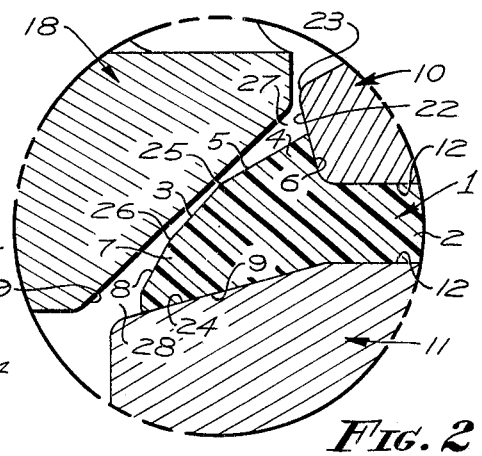
FIG. 2 is an enlarged fragmentary sectional view, taken within circle 2 of FIG. 1, showing the normal contour of the seal.

Reference is directed first to FIGS. 1 through 4. The seal, designated generally by 1, includes a radially outer annular fixed seal disk 2, the outer portion of which has parallel sides so as to be clamped between opposing members. The radially inner surface of the disk forms a conical seal surface 3.

The upper side of the seal, continuing from the upper margin of the seal surface 3, forms an annular rib or buttress 4 of triangular cross section, forming a radially inner conical surface 5, and a radially outer conical surface 6. The surface 5 forms a cone of greater included angle than the seal surface 3.

A second annular rib or buttress 7 is formed at the underside of the seal 1, and is provided with an an inner conical surface 8, and an outer conical surface 9. The inner conical surface 8 continues downwardly from the seal surface 3 and defines a cone of lesser included angle than the seal surface 3.

The outer conical surface 6 and the cutter conical surface 9 of the two buttresses 4 and 7, converge toward the fixed seal disk 2. The surface 6 forming a relatively steep angle with respect to the upper face of the seal disk 2, whereas the surface 9 forms a more obtuse angle.

The seal 1 is intended to be clamped between two valve housing members 10 and 11, having confronting clamp faces 12, which engage the parallel surfaces of the seal disk 2. The clamp faces 12 are provided with one or more retaining ribs 13, which press into the surface of the seal disk 2. The manner in which the housing members perform their clamping function is immaterial to the present invention, but for purposes of illustration, they are shown as joined by a coupling ring 14, and may incorporate stop shoulders 15 so that the clamping force on the seal disk may be predetermined.

The housing member 10 is provided with a suitable valve chamber 16, and the housing member 11 is provided with an axially aligned inlet passage 17. An axially movable valve member 18 is positioned in the housing member 10 and is provided with a conical valve face 19, engageable with the seal surface 3. For purposes of illustration, the valve member is shown as provided with an outlet bore 20, having lateral openings 21, communicating with the valve chamber 16.

The housing member 10 is provided adjacent its clamp face with an abutment shoulder 22, which conforms to the slope of the conical surface 6 of the upper buttress 4. Immediately above the shoulder 22, the housing 10 forms a clearance opening 23 for the valve member 18. The housing member 11 is also provided with an abutment shoulder 24, conforming to the gradual slope of the conical surface 9 of the lower buttress 7.

Operation of the valve and seal is as follows:

The seal is formed of an elastomer, the properties of which may vary depending upon the intended use of the valve. It is preferred that in profile the seal surface 3 and the buttress surfaces 5 and 8 be straight and join at rather abrupt junctures 25 and 26. The included angle at these junctures is preferably in the order of 160° to 170°; however, this angle may be greater or even less, depending upon the particular valve application. Also, rather than an abrupt juncture, the surfaces may merge one into the other, defining a curved profile. In any case, the buttress surfaces 5 and 8 diverge from the valve face 19. It is also preferred that the seal surface 3 diverge from the valve face 19 a few degrees in the order of 2° to 4° so that the initial contact between the valve face 19 and the seal is a line contact. It will be noted that the the abutment shoulders 22 and 24 extend beyond the mating buttress surfaces 6 and 9 respectively, so that small annular chambers 27 and 28 of triangular cross section are formed. These chambers permit limited flow of the material comprising the seal when the seal is subjected the pressure exerted by the face 19 of the valve member 18. The dimensions of these annular chambers are such that the flow is well within the elastic limits of the material. In fact, under normal conditions of operation, as suggested in FIG. 3, the displacement of the material comprising the seal is nominal. Under conditions of excessive pressure exerted by the valve member, as suggested in FIG. 4, the material comprising the seal becomes for all practical purposes, completely confined so that no further flow or displacement occurs. That is, the buttresses 4 and 7 are completely backed by the abutment shoulders 22 and 24 respectively, and no damage to the seal occurs even under excessive loads.

The buttresses 4 and 7 perform another function. If the nature of the installation requires, the seal disk 2 may be subjected to a high compressive force in an axial direction and inasmuch as the seal is confined in its outer periphery, the material can flow only radially inward. If the seal were of uniform thickness, the stress in the region of the seal surface 3 would be high and the inner periphery of the seal would tend to shrink inwardly distorting the seal surface. The buttresses minimize this effect by distributing the inward flow of material from the region of the seal disk so that any distortion of the seal surface 3 is minimized.

The function of the buttresses may be further enhanced, if required, by molding the buttress 4 so that it is slightly large for the space in which it fits so that initially the buttress when forced within the shoulder 22, is placed under a predetermined radial compression. Then, when the seal 2 is axially compressed with resultant radial displacement, the desired sealing contact between the surfaces 6 and 22 is maintained until the resistance of the buttress 4 to further radial compression is overcome. As the forces here involved are controllable by assembly tolerances, the buttress 4 can be depended upon to maintain the surface 6 in contact with the shoulder 22.

Initial radial compression of the buttress 4 has the tendency to deflect the lower buttress 7 downward increasing the contact force between the surfaces 9 and 24.

After assembly, the entire seal and including the buttresses are under compressive stress, which, although reduced when the valve is chilled as in cryogenic use, has the effect of reducing the strain in the seal at the time of contact by the valve member 18.

Figure 5:
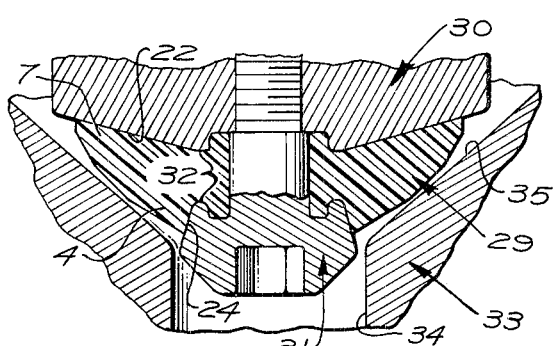
FIG. 5 is a fragmentary sectional view, similar to FIG. 1, but showing a modified form of the valve and seal in which the seal is carried by the valve plunger.
Figure 3:
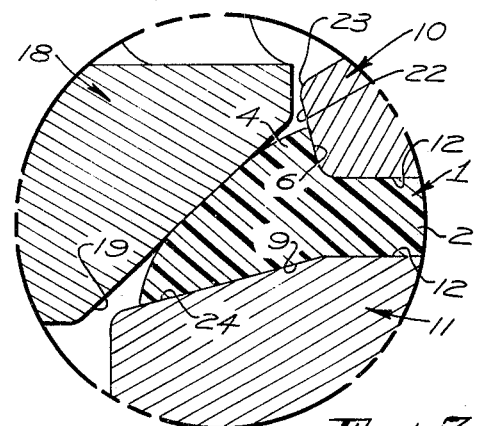
FIG. 3 is a similar view, showing the seal slightly distorted under condition of normal contact by the valve face.

Reference is now directed to FIG. 5. Whereas in FIGS. 1 through 4 the seal 1 is shown as a fixed member with a central opening formed by the seat 3 and the buttresses 4 and 7, in FIG. 5 the seal 29 has all of the features of the seal 1 except that the seal surface 3 and the buttresses 4 and 7 face radially outward rather than radially inward. In this case, the seal 29 is mounted on a valve plunger 30 and held there by a clamp screw 31. The confronting surfaces of the plunger and clamp screw serving the same function as the clamp faces 12, and are provided with suitable retaining ribs 32 corresponding to the ribs 13 but which may be different in form.

The valve plunger fits within a suitable valve body 33, having an inlet bore 34 which diverges to form a valve seat face 35. The valve seat face 35 forming the same function as the valve face 19. It will be seen that the valve plunger 30 is provided with an abutment shoulder 22 and that the clamp screw 31 is provided with an abutment shoulder 24 as in the first described structure, and that the butresses 4 and 7 are utilized in the modified construction in the same manner as in the first described structure. However, as illustrated, the seal 29 is positioned upsidedown with respect to the position of the seal 1, but in the same relative relation as the seal 1 bears to the conical face 19 of the valve member 18.

Operation of the seal 29, shown in FIG. 5, is identical to the operation of the seal 1.

Figure 6:
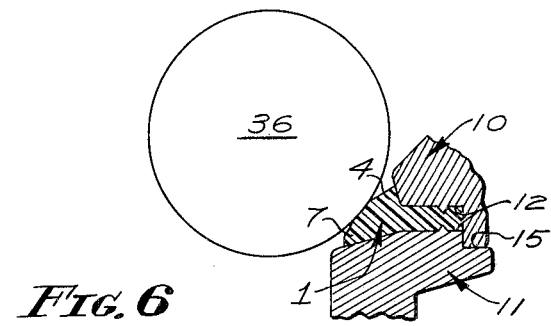
FIG. 6 is a fragmentary sectional view, showing the seal adapted for engagement by a ball valve element.
Figure 4:
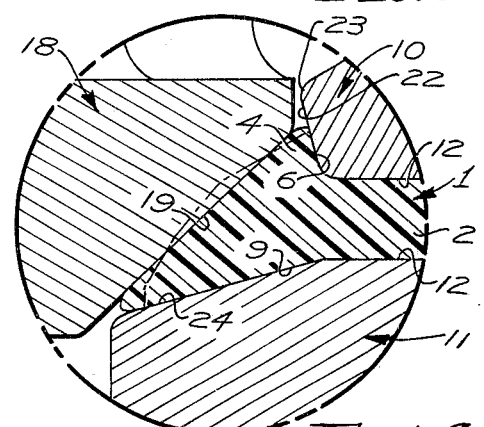
FIG. 4 is a similar fragmentary sectional view, showing the valve seal under excessive load, but performing its sealing function.

Reference is now directed to FIG. 6. While the valve face 19 is shown as conical in the preceding embodiments, it is feasible to provide a valve face which is generally spherical, provided that the radius is relatively large with respect to the dimensions of the seal surface 3 and the surfaces 5 and 8 of the buttresses. By way of illustration, the convex surface may be part of a sphere or ball 36.

I claim:

1. A seal for use in a valve having opposed annular clamping faces and annular buttress backing walls diverging therefrom in a radial direction and confronting a relatively movable valve face, said seal comprising:
   (a) an annular disk portion adapted to be clamped and sealed between said clamping faces;
   (b) an annular seal portion of generally conical surface radially disposed with respect to said disk portion and integral therewith and confronting said valve face for engagement therewith;
   (c) a first integral annular butress portion at one axial side of said disk portion and seal portion;
   (d) and a second integral annular buttress portion at the other axial side of said disk portion and seal portion;
   (e) said buttress portions including exposed surfaces confronting said valve face with each said exposed surface defining an obtuse angle with said conical surface; and said buttress portions also including generally frusto-conical surfaces diverging with respect to each other to conform to and bear against said buttress backing walls, whereby on increased pressure of said valve face on said annular seal portion the exposed surfaces of said buttress portions are progressively engaged by said valve face and said buttress portions are compressed between said valve face and said buttress backing walls.

2. A valve comprising:
   (a) a fixed structure and movable structure one of said structures defining an essentially conical valve face;
   (b) the other of said structures including backing walls relatively diverging toward said valve face and each forming an acute angle therewith;
   (c) a seal member formed of elastomeric material including an annular buttress portion of essentially triangular cross section having a generally frusto-conical supported side fitting each backing wall and a sealing face confronting said valve face to define an acute angle therewith; and a seal portion between said buttress portions and having a sealing face initially engageable with said valve face defined with the sealing faces of said buttress portions an essentially convex surface progressively engageable with said valve face upon increased pressure between said seal member and said valve face.

3. A valve, as defined in claim 2, wherein:
   (a) said convex surface defines an opening and said valve face moves axially therein.

4. A valve, as defined in claim 2, wherein:
   (a) said valve face forms an opening and said convex surface moves axially therein.

5. A valve comprising:
   (a) a fixed structure and a movable structure one of said structures defining an essentially conical valve face;
   (b) the other of said structures including opposed clamping means and relatively diverging backing walls continuing from said clamping means toward said valve face and forming acute angles therewith;

(c) and a seal member including an annular disk portion clamped between said clamping means; an integral seal portion disposed in the plane of said disk portion and engageable with said valve face; and integral buttress portions of essentially triangular cross section disposed at opposite sides of said seal portion between said valve face and backing walls, the surfaces of said buttress portions confronting said valve face diverging therefrom and the surfaces of said buttress portions confronting said backing walls being generally frusto-conical and adapted to bear against said backing walls.

6. A valve, comprising:

(a) a fixed structure and a movable structure, one of said structures defining an essentially conical valve face;

(b) the other of said structures including opposed annular clamping means and a backing wall continuing radially and angularly from each clamping means, said walls diverging from each other toward said valve face, each wall defining an acute angle with the valve face and movable to bring its extremity into close proximity thereto whereby said walls and valve face form an annular substantially enclosed chamber of triangular cross section between said valve face and said clamping means;

(c) a deformable seal member including a first annular portion adapted to be secured and sealed between said clamping means, and a second annular portion of essentially triangular cross section integral with said first annular portion and adapted to be confined in said chamber.

(d) said second annular portion including a pair of buttress portions each having a surface conforming to and supported by the corresponding one of said backing walls and a sealing surface confronting said valve face in angular relation thereto, said sealing surfaces extending in opposed directions from an initial sealing surface to form a generally convex sealing face for initial contact with said valve face by essentially line contact with said initial sealing surface and being progressively deformable into conformity with said valve face as said valve face approaches the extremities of said backing walls, thereby to confine said second annular portion of the seal member in a substantially triangular position.

References Cited

UNITED STATES PATENTS

| 1,686,849 | 10/1928 | Frauenheim | 251—333 X |
| 1,733,180 | 9/1929 | Biedermann | 251—333 X |
| 1,774,690 | 9/1930 | Willoughby. | |
| 2,519,541 | 8/1950 | Bryant | 251—332 |
| 3,145,733 | 8/1964 | Shaw et al. | 251—357 X |

ARNOLD ROSENTHAL, Primary Examiner

U.S. Cl. X.R.

251—361